US010026330B2

(12) United States Patent
Burford

(10) Patent No.: US 10,026,330 B2
(45) Date of Patent: Jul. 17, 2018

(54) OBJECTIVELY CHARACTERIZING INTERVENTION IMPACTS

(71) Applicant: Accenture Global Solutions Limited, Dublin (IE)

(72) Inventor: Kelly Burford, Bellevue, WA (US)

(73) Assignee: Accenture Global Solutions Limited, Dublin (IE)

(*) Notice: Subject to any disclaimer, the term of this patent is extended or adjusted under 35 U.S.C. 154(b) by 235 days.

(21) Appl. No.: 15/057,238

(22) Filed: Mar. 1, 2016

(65) Prior Publication Data

US 2017/0256173 A1  Sep. 7, 2017

(51) Int. Cl.
| | | |
|---|---|---|
| *G06F 17/30* | (2006.01) | |
| *G09B 5/12* | (2006.01) | |
| *G06N 99/00* | (2010.01) | |
| *G09B 19/00* | (2006.01) | |

(52) U.S. Cl.
CPC ....... *G09B 5/125* (2013.01); *G06F 17/30554* (2013.01); *G06N 99/005* (2013.01); *G09B 19/00* (2013.01); *G06F 17/30867* (2013.01)

(58) Field of Classification Search
None
See application file for complete search history.

(56) References Cited

U.S. PATENT DOCUMENTS

| | | | | |
|---|---|---|---|---|
| 2003/0049596 | A1* | 3/2003 | Uda | A63B 69/00 434/362 |
| 2006/0234201 | A1* | 10/2006 | Pierson, III | G09B 7/00 434/323 |
| 2006/0281065 | A1* | 12/2006 | Margiotta | G09B 19/00 434/365 |
| 2013/0089851 | A1* | 4/2013 | Drane | G09B 5/06 434/362 |
| 2014/0234826 | A1* | 8/2014 | Breznitz | G09B 7/00 434/362 |
| 2015/0120786 | A1* | 4/2015 | Slovacek | G06F 17/30554 707/803 |
| 2016/0260346 | A1* | 9/2016 | Lafrinere | G09B 5/06 |

* cited by examiner

*Primary Examiner* — Jason Yen
(74) *Attorney, Agent, or Firm* — Fish & Richardson P.C.

(57) ABSTRACT

The disclosed embodiments include computerized methods and systems, including computer programs encoded on a computer storage medium, for objectively characterizing an impact of an intervention on individuals or groups. For example, a computing system may obtain, and store in a data lake, intervention data identifying interventions, and objective data characterizing an impact of these interventions on at least one individual. The computer system may also populate a queryable interface with query parameters (e.g., at least one of the interventions and at least a portion of the objective data), which may be presented to a user via a device. The computer system may obtain stored intervention and objective data consistent with a received query, which may be provided to the device for presentation to the user. The disclosed embodiments also provide a visual representation of trends in the stored data and candidate interventions the address the identified trends without user input.

20 Claims, 5 Drawing Sheets

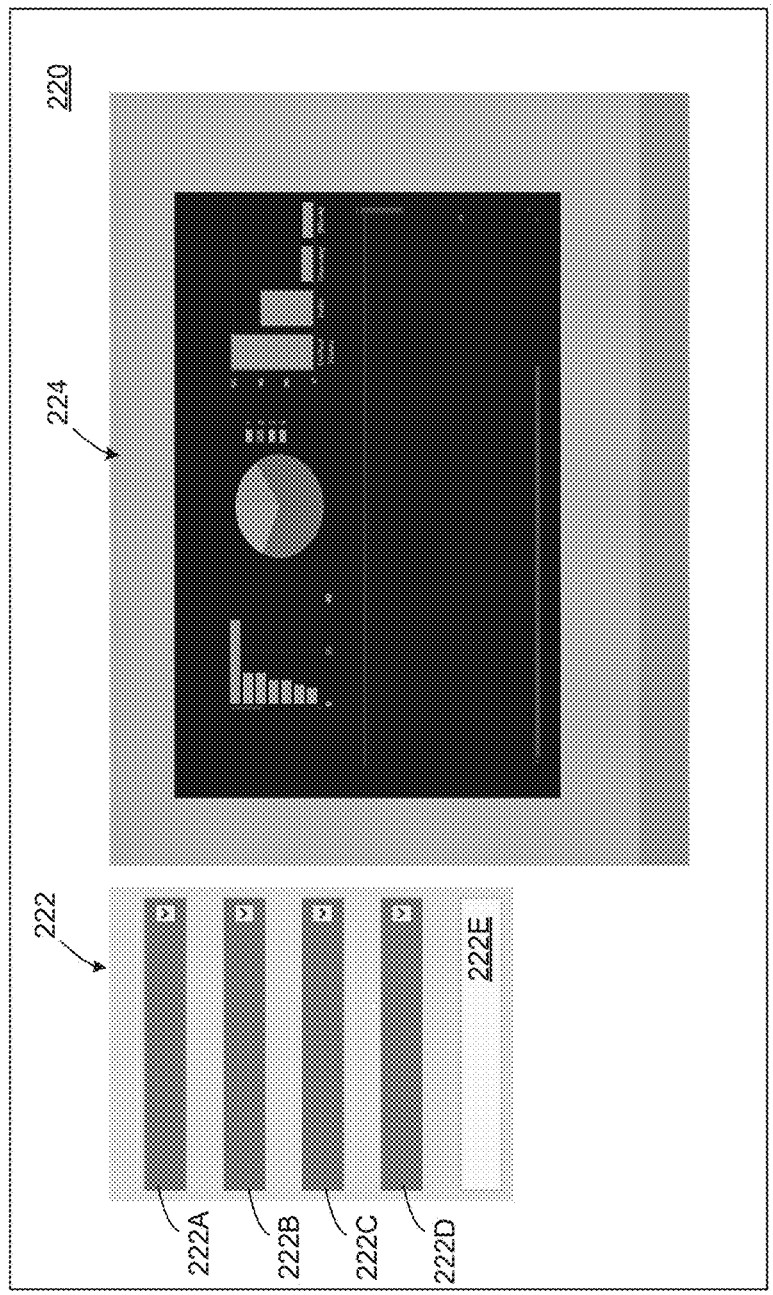

OBJECTIVELY CHARACTERIZING INTERVENTION IMPACTS

FIELD

This specification describes technologies related to enterprise data management.

BACKGROUND

Modern enterprises expend significant time, energy, and funds to develop and implement training programs to improve a performance of employees, managers, and other stakeholders. Conventional processes that assess an impact and effectiveness of these training programs often fail due to combinations of faulty assumptions, subjective biases, and/or insufficient front-end analysis. Beyond basic attendance data, these conventional processes are often unable to derive objective metrics that indicate an impact or an effectiveness of these training programs (e.g., or interventions), and thus, that provide actionable insight for the development of additional training programs and enterprise interventions.

SUMMARY

The disclosed embodiments relate to computerized processes that objectively characterize an impact of an intervention, such as a training course or workplace configuration, on a behavior on one or more individuals or groups of individuals. Through the disclosed embodiments, a computing system may obtain data indicative of one or more interventions from databases maintained by enterprise systems and platforms, and may obtain objective data indicative of a performance, environment, and/or physical condition of the impacted individuals or groups (e.g., as captured and/or collected by various devices such as Internet-of-Things (IoT) connected devices, workstations, and radio-frequency (RF) devices. The computing system may, for example, tag the obtained intervention and objective data, and store the tagged intervention and objective data in their native data formats within one or more data lakes.

The computing system may also populate a queryable graphical user interface (GUI) with one or more candidate query parameters, from which a user may define a query for portions of the stored data relevant to a particular intervention and its impact on a particular group of individuals. The computing system may provide data indicative of the populated GUI to a client device, which may present the populated GUI, and the candidate query elements, to a user through a corresponding display device. The user may, in some instances, provide input to the client device that identifies one or more of the candidate query parameters (e.g., a particular intervention, impacted individuals, demographic and/or geographic parameters, performance metrics, etc.), and the client device may transmit the identified candidate query parameters to the computing system.

The computing system may receive the candidate query parameters, and query the data lake for stored intervention and objective data that is consistent with the candidate query parameters. For example, a processing engine of the data lake may extract and/or process portions of the stored intervention and objective data to comport with the performance metrics specified within the candidate query parameters, and may transmit the extracted and processed data to the computing system. The computing system may provide the extracted and processed data to the client device in response to the candidate query parameters, and the client device may present portions of the extracted and processed data to the user within the queryable GUI. The user may, in some embodiments, view the presented data and objectively characterize and impact of the intervention and objectively assess an effectiveness of the intervention in modifying a behavior of the impacted individuals.

In an embodiment, an apparatus includes at least one processor and a memory storing executable instructions that, when executed by the at least one processor, causes the at least one processor to perform the step of storing first and second data within a data repository. In one aspect, the first data may identify a plurality of interventions, and the second data may characterize an impact of the interventions on at least one individual. Based on at least a portion of the first and second data, the at least one processor may further perform the step of establishing candidate query parameters for a queryable interface, and providing the candidate query parameters to a client device for presentation within the queryable interface. The candidate query parameters may, in some aspects, identify the interventions, the at least one individual, and portions of the second data. The at least one processor may further perform the step of receiving, from the client device, query data comprising at least a portion of the candidate query parameters, querying the data repository to obtain data consistent with the received portion of the candidate query parameters, and providing the obtained data to the client device. In some aspects, the portion of the candidate query parameters may identify at least one of the interventions and at least a portion of the second data, and the client device may be configured to present a visual representation of obtained data within the queryable interface, and the visual representation may objectively characterize an impact of the at least one intervention on the at least one individual.

In certain aspects, the data repository includes at least one data lake having a corresponding processing engine. The at least one processor may further perform the steps of obtaining at least a portion of the first data from one or more databases, and obtaining at least a portion of the second data from one or more devices. For example, the one or more databases may be maintained by at least one of a learning management system platform, an enterprise resource management system, or a social-media system. Further, in some instances, the one or more devices may include at least one of an IoT connected device, a workstation, a mobile communications device, or a radio-frequency (RF) device, and the IoT connected device may include a wearable device comprising at least one of a biometric sensor or an environmental sensor. The at least one processor may also perform the step of establishing a secure communications session with at least one of the one or more databases or the one or more devices through an application programming interface (API).

In some aspects, the plurality of interventions may include at least one of a purposeful or non-purposeful action impacting the at least one individual. For example, the plurality of interventions may include at least one of (i) a training program in which the at least one individual participates, (ii) a change in a configuration of a workplace of the at least one individual, (iii) scheduled or unscheduled leave of the at least one individual, (iv) a change in a work schedule of the at least one individual, or (v) a change in a management structure of the workplace of the at least one individual. Further, in additional aspects, the second data may include at least one of (i) data indicative of a performance of the at least one individual within a workplace, (ii) data indicative of one or more environmental conditions experienced by the at least one individual, and (iii) biometric data indicative of a physical condition of the at least one individual.

The least one processor may also perform the steps of modifying at least a portion of the first and second data to incorporate corresponding first and second tags and storing the modified first and second data within the data repository. The modification may, in some instances, maintain a native format of the first and second data. Based on at least one of the first or second tags, the at least one processor may also perform the steps of identifying a portion a least one of the first or second data for presentation within the queryable interface, and providing the at least one identified portion of the first or second data to the client device, which may present a visual representation of at least one of identified portion of the first or second data within the queryable interface without input from the user.

Additionally, the at least one processor may also perform the step of generating profile data for the at least one individual. The generated profile data may, for example, include one or more identifiers representative of the at least one individual within the first and second data. The generated profile data may also include holistic data identifying a subset of the interventions that impact the at least one user. Based on the generated profile data, the at least one processor may also perform the steps of identifying one or more individuals impacted by the at least one identified intervention, and querying the data repository to obtain data consistent with the received portion of the candidate query parameters and associated with the one or more identified individuals.

In further aspects, the at least one processor may further perform the steps of identifying a trend within the stored first and second data, and providing data indicative of the identified trend to the client device. The identified trend may include a time variation of at least one of a performance of the at least one individual within a workplace, an environmental condition experienced by the at least one individual, or a physical condition of the at least one individual, and the client device may be configured to present a visual representation of the identified trend within a portion of the queryable interface without input from the user. Additionally, the at least one processor may perform the steps of establishing at least one candidate intervention that mediates or exploits the identified trend, and providing data indicative of the identified trend and established candidate intervention to the client device. The client device may, for example, be configured to present a visual representation of the identified trend and established candidate intervention within a portion of the queryable interface without input from the user. The at least one processor may also perform the steps of applying a machine-learning algorithm to at least a portion of the stored first and second data, and based on an outcome of the applied machine-learning algorithm, establishing the at least one candidate intervention.

In further embodiments, an apparatus includes at least one processor and a memory storing executable instructions that, when executed by the at least one processor, causes the at least one processor to perform the step of storing first and second data within a data repository. In some aspects, the first data may identify a plurality of interventions, and the second data may characterize an impact of the interventions on at least one individual. The at least one processor may also perform the steps of identifying a trend within the stored first and second data, establishing at least one candidate intervention that mediates or exploits the identified trend, and providing data indicative of the identified trend and established candidate intervention to a client device. The trend may, for example, include a time variation of at least one of a performance of the at least one individual within a workplace, an environmental condition experienced by the at least one individual, or a physical condition of the at least one individual. The client device may also be configured to present a visual representation of the identified trend and established candidate intervention within a portion of a queryable interface without input from the user.

In some aspects, the at least one processor may further perform the steps of applying a machine-learning algorithm to at least a portion of the stored first and second data, and based on an outcome of the applied machine-learning algorithm, establishing the at least one candidate intervention. Based on at least a portion of the first and second data, the at least one processor may also perform the steps of establishing candidate query parameters for the queryable interface, the candidate query parameters identifying the interventions, the at least one individual, and portions of the second data, and providing the candidate query parameters to a client device for presentation within the queryable interface. The at least one processor may also perform the steps of receiving, from the client device, query data comprising at least a portion of the candidate query parameters, querying the data repository to obtain data consistent with the received portion of the candidate query parameters, and providing the obtained data to the client device. In certain aspects, the portion of the candidate query parameters may identify at least one of the interventions and at least a portion of the second data, and the client device may be configured to present a visual representation of obtained data within the queryable interface, and the visual representation objectively characterizing an impact of the at least one intervention on the at least one individual. Additionally, in some aspects, the data repository may include at least one data lake, the at least one data lake having a corresponding processing engine.

In other embodiments, corresponding computer-implemented methods and computer programs may be configured to perform those steps performed by the exemplary apparatus described above. One or more computer programs can be so configured by virtue of having instructions that, when executed by device, cause the device to perform the actions.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 2C is a diagram of an exemplary queryable graphical user interface, consistent with the disclosed embodiments.

Like reference numbers and designations in the various drawings indicate like elements.

DETAILED DESCRIPTION

Figure 1:
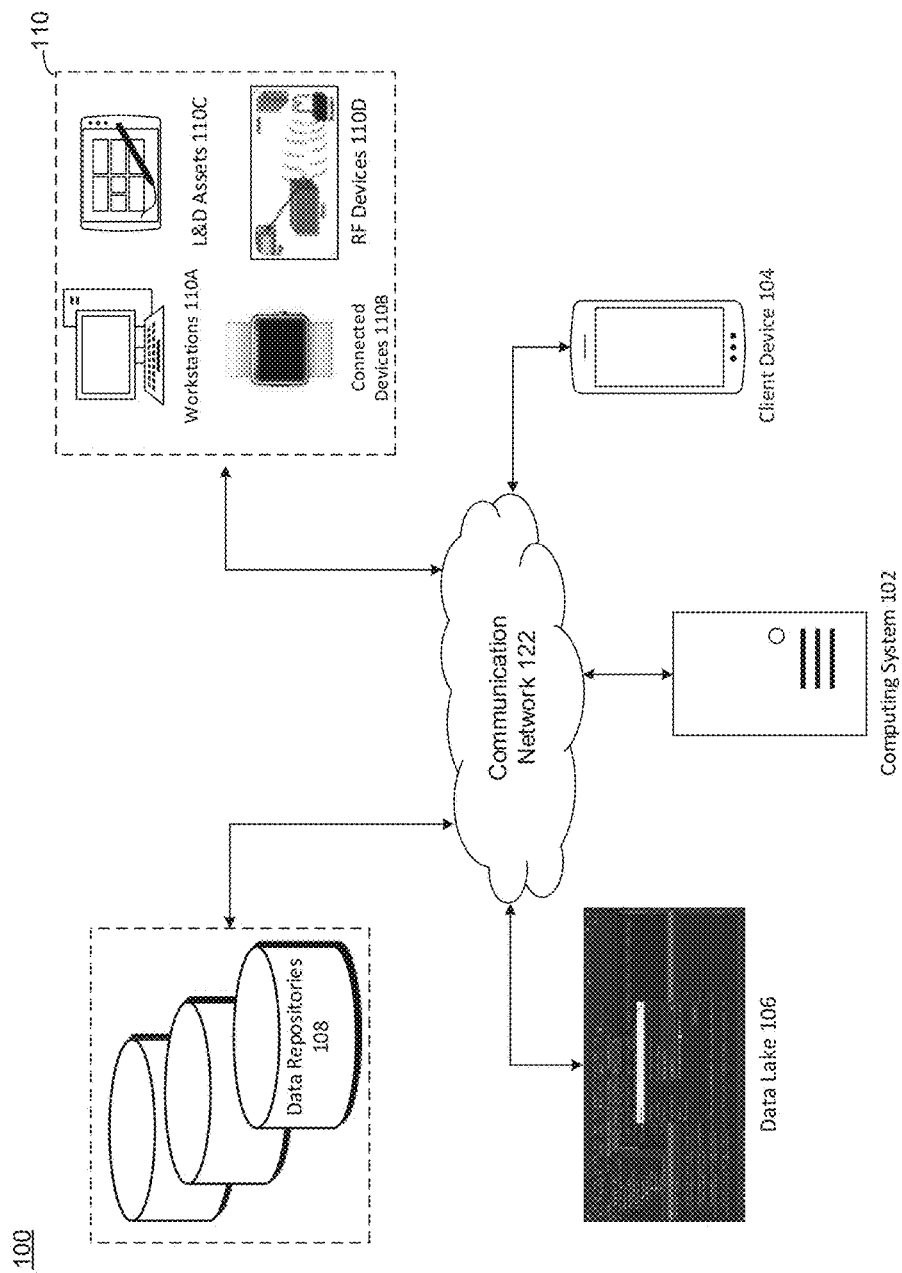
FIG. 1 is a diagram of an exemplary computing system, consistent with the disclosed embodiments.

FIG. 1 illustrates an exemplary system 100 for objectively characterizing an impact of an intervention on an individual or a group of individuals. In certain aspects, and as described below, an intervention may represent a purposeful or non-purposeful action that involves the individual and/or the group, and further, is capable of modifying a behavior of the individual and/or the group.

In some instances, interventions consistent with the disclosed embodiments may include purposeful actions initiated by the individual, the group, and/or entities related to the individual or the group (e.g., supervisors within a workplace, governmental or regulatory entities, etc.). For example, these purposeful actions may include, but are not limited to, coursework or training programs in which the individual or group participates (e.g., as administered through a corresponding learning-management system (LMS) platform), a change in a physical configuration of a workplace of the individual or group (e.g., as administered through an enterprise resource management (ERM) system), a change to one or more operational settings in the workplace (e.g., a thermostat setting, a circulation of air, lighting conditions, etc.), a change in a work or vacation schedule of the individual or group, and/or a change in a structure of the individual's or the group's compensation or management.

In other instances, interventions consistent with the disclosed embodiments may include non-purposeful actions or events that impact the behavior of the individual or the group. By way of example, these non-purposeful actions may include, but are not limited to, weather events, traffic conditions, and or local or national emergencies. The disclosed embodiments are, however, not limited to these exemplary purposeful and non-purposeful actions, and in other aspects, interventions consistent with the disclosed embodiments may include any additional or alternate action or event that impacts the performance of the individual or group.

The disclosed embodiments may, in certain aspects, collect data indicative of a performance of the individual or group prior to and after the intervention, environmental conditions experienced by the individual or group, and/or physical conditions of the individual or group, and based on the collected data, analyze and objectively characterize the impact of the intervention on the individual or group. In some aspects, system 100 may provide, to a user, an objective analysis of the actual impact of the intervention without the subjective biases that often plague conventional analytical processes.

Referring back to FIG. 1, system 100 may include a computing system 102, a client device 104, a cloud-based data lake 106, one or more data repositories 108, one or more devices 110, and, and a communications network 122 capable of interconnecting one or more of the components of system 100. In certain aspects, network 122 may include, but is not limited to, a wireless local area network (LAN), e.g., a "WiFi" network, a RF network, a Near Field Communication (NFC) network, a wireless Metropolitan Area Network (MAN) connecting multiple wireless LANs, and a wide area network (WAN), e.g., the Internet.

Client device 104 may include, but is not limited to, a mobile telephone, a smart phone, a tablet computer, a desktop computer, laptop computer, a tablet computer, a wearable computer, a music player, an e-book reader, a navigation system, or any other appropriate computing device capable establishing communications with components of system 100 across communications network 122. Further, computing system 102 may include one or more computer systems (e.g., servers, nodes of a distributed cloud system, etc.) configured to execute software instructions stored in memory performing one or more processes consistent with the disclosed embodiments and to communicate with one or more components of system 100 across network 122.

In some aspects, data lake 106 may be in communication with computing system 102 and as described below, may be configured to maintain intervention data and objective data in native formats consistent with their corresponding sources (e.g., a structured, semi-structured, and/or unstructured format consistent with the sources of the intervention data and objective performance data). In additional embodiments, data lake 106 may also include a processing engine capable of establishing a format and/or structure of portions of the stored intervention data and objective performance data queried by computing system 102. In one example, data lake 106 may correspond to a Microsoft Azure Data Lake™. The disclosed embodiments are, however, not limited these exemplary data lakes, and in other aspects, data lake 106 may include any additional or alternate large-scale, cloud-based storage mechanism capable of maintaining data in native format until required for analytical processing (e.g., leveraging Hadoop-oriented object storage).

Data repositories 108 may include one or more data repositories or databases configured to store data (e.g., intervention data) characterizing interventions that impact the individual and/or the group. For example, data repositories 108 may include one or more databases established and maintained by corresponding learning management systems (e.g., LMS databases). For instance, the LMS databases may be structured in SumTotal™ format, Moodle™ format, MySQL or SQL formats, or in any additional or alternate commercial or open-source format.

In certain instances, LMS databases consistent with the disclosed embodiments may identify one or more courses and/or training programs in which the individual or the group participates (e.g., by course or program identifiers), may identify the individual or the group that participated in the course and/or training program (e.g., through unique identifiers assigned to the individual or group by corresponding ones of the learning management system), and further, may include characteristics of the interaction of the individual or group with the courses and/or training programs. For example, the characteristic data may include, but is not limited to, a time or date of the course and/or training program, a location at which the source and/or training program was offered to the individual or group, and a metric indicative of each individual's success in completing the courses and/or training programs.

In other aspects, data repositories 108 may also include one or more databases established and maintained by corresponding ERM systems (e.g., ERM databases). By way of example, data maintained by ERM databases consistent with the disclosed embodiments may include, but are not limited to, human-resources data (e.g., employment, payroll, scheduling, and/or benefits data), manufacturing data (e.g., data identifying work orders, manufacturing projects and processes, bills of materials, workflow management, etc.), and supply-chain-management data (e.g., inventory data, warehousing configuration data, etc.).

For instances, one or more of the ERM databases may identify changes or variations in workplace configurations (e.g., a configuration or arrangement of enterprise resources within a workplace of the individual or group), changes in operational settings of physical plant elements within the workplaces (e.g., thermostat settings, settings of air-handling and HVAC units, etc.), and data characterizing occurrences of these changes (e.g., a time and date of change, etc.). For instance, the workplace of the individual or group may correspond to a warehouse setting, and one or more of the ERM databases may identify a change in an arrangement of inventory within the warehouse, an arrangement of walkways (e.g., routes taken by individuals) and/or motorways (e.g., routes taken by forklifts and shop trucks) throughout the warehouse, a thermostat setting at various locations throughout the warehouse, and/or times and dates on which these arrangements and settings were established or changed.

Additionally, in certain aspects, data repositories 108 may also include data indicative of an activity of the individual or group within one or more social networks and/or microblogging services (e.g., Facebook™, LinkedIn™, Twitter™, Instagram™, etc.). The social-media data associated with the individual or group may, in some instances, identify interventions related to scheduled vacations, unscheduled leave (e.g., sick leave), and/or changes in work schedule or compensation structure. Further, social-media data consistent with the disclosed embodiments may be stored within corresponding databases maintained by the social networks and/or microblogging services, and additionally or alternatively, by third-party systems capable of accessing content streams and feeds provided by the social networks and/or microblogging services.

The disclosed embodiments are, however, not limited to the data repositories that include these exemplary LMS databases, ERM databases, and social-media databases. In other aspects, data repositories 108 may include any additional or alternate data that identifies, characterizes, or relates to interventions capable of impacting the individual or group, such as data identifying metrics (e.g., objective performance metrics) by which the disclosed embodiments may characterize the impact of the interventions on the performance of the individual or group.

System 100 may also include devices 110, which may include, but are not limited to, workstations 110A, Internet-of-Things (IOT) connected devices 110B, learning and development (L&D) assets 110C, and radio-frequency devices 110D. In certain aspects, one or more of devices 110 may be held or operated by corresponding individuals, and as described below, devices 110 may detect and capture objective data indicative of an impact of an intervention on these corresponding individuals.

For example, workstations 110A may be disposed at a workplace of an individual (e.g., an employee), and the employee may access one or more of workstations 110A using authentication credentials provided by an employer (e.g., a unique identifier assigned to the employee by the employer and a corresponding password). In some instances, workstations 110A may capture data indicative of one or more actions taken by the employee when operating workstations 110A, and may store the captured data in conjunction with the assigned unique identifier for transmission to computer system 102 across network 122, as described below.

In some instances, one or more of IoT connected devices 110B may be assigned to an individual (e.g., identifiers of IoT connected devices 110B may be correlated to a unique identifier of the individual), and may include, but are not limited to, smart phones, tablet computers, smart watches, optical head-mounted display (OHMD) units (e.g., Google Glass™, etc.), wearable devices, and/or smart textiles. IoT connected devices 110B may, for example, include one or more sensors capable of detecting, at discrete points in time, the individual's location, environmental conditions to which the individual is exposed, and additionally or alternatively, characteristics indicative of the individual's physical condition (e.g., biometric conditions). IoT connected devices 110B may, in additional instances, be configured to store locally data indicative of the detected, time-dependent location, environmental conditions, and/or biometric conditions in associated with the individual's unique identifier, and as described below, IoT connected devices 110B may be configured to transmit portions of the stored data across network 122 to computing system 102 for processing and storage in data lake 106.

For example, one or more of IoT connected devices 110B may include a biometric sensor capable of detecting the individual's body temperature, pulse rate, respiration rate, and/or level of bloodstream oxygen saturation at discrete points in time. Additionally or alternatively, one or more of IoT connected devices 110B may include a temperature sensor capable of detecting, at discrete points in time, an ambient temperature of an individual's environment. In other instances, one or more of IoT connected devices 110B may include additional sensors capable of detecting various environmental conditions within an individual's environment, such as a concentration of aerosolized particulates, a concentration of various gaseous chemicals, and/or a level of ambient radioactivity. The disclosed embodiments are, however, not limited to these exemplary IoT devices and exemplary location, biometric, and environmental sensors, and in other aspects, IoT connected devices 110B may include any additional or alternate device type and any additional or alternate sensor capable of detecting, capturing, and storing data indicative of an individual's performance or condition within a corresponding environment (e.g., a workplace, etc.).

L&D assets 110C may include one or more computing systems and devices assigned to or utilized by individuals during portions of training programs (e.g., as established an managed by the LMS platform described above). In some aspects, L&D assets 110C may be configured to capture data indicative of an individual's activities when participating in the training programs (e.g., through corresponding location, environmental, and/or biometric sensors), and to store locally portions of the captured data (e.g., L&D data) in association with a unique identifier of the individual (e.g., as established by the learning management system). As described below, L&D assets 110C may also be configured to transmit portions of the stored L&D data to computer system 102 across network 122.

In additional aspects. RF devices 110D may include, among other things, one or more radio-frequency identification (RFID) scanners or readers capable of detecting a proximity of a corresponding RFID tag. For example, RF devices 110D may be disposed along an assembly line of a manufacturing plant, and may be configured to detect a progression of an article (e.g., a consumer electronic device, an automobile, etc.) along that assembly line. In other aspects, RF devices 110D may be disposed at various portions throughout a warehouse, and an RFID tag held by an employee (e.g., included within an identification badge or handheld device of the employee) may enable RF devices 110D to track a time-varying progression of the employee through the warehouse as that employee collects inventory to satisfy one or more customer orders. The disclosed embodiments are, however, not limited to these exemplary RF devices, and in other aspects, RF devices 110D may include any additional or alternate numbers and types of devices that would be appropriate to tracked individuals or articles and capable of generating data indicative of an impact of an intervention.

RF device 110D may, for example, be configured to locally store data indicative of the detected RFID tags (e.g., data identifying a location and time of detection), and in some aspects, associate the stored data with a corresponding tracked individual or article (e.g., through an association with an identifier of a corresponding RFID tag). RF device 110D may also be configured to transmit portions of the stored data to computer system 102 across network 122, as described below.

The disclosed embodiments may, in some aspects, enable computing system 102 to obtain data identifying interventions involving one or more individuals (e.g., based on data obtained from data repositories 108), and to obtain objective data indicative of an impact of these interventions on a performance, physical condition, or ambient environment of these individuals (e.g., as captured by and obtained from device 110). As described below in reference to FIGS. 2A and 2B, computing system 102 may perform operations that establish correlations between portions of the obtained objective data and specific interventions, and based on the determined correlations, characterize an impact of one or more of the interventions on the performance, physical condition, or ambient environment of the one or more individuals, and provide a graphical representation of the characterized impact to a user through a corresponding interface (e.g., as presented by client device 104). By generating and presenting an objective analysis of the intervention impact based on collected data, the disclosed embodiments may eliminate the subjective biases that often plague conventional, ad-hoc analytical processes.

Figure 2A:
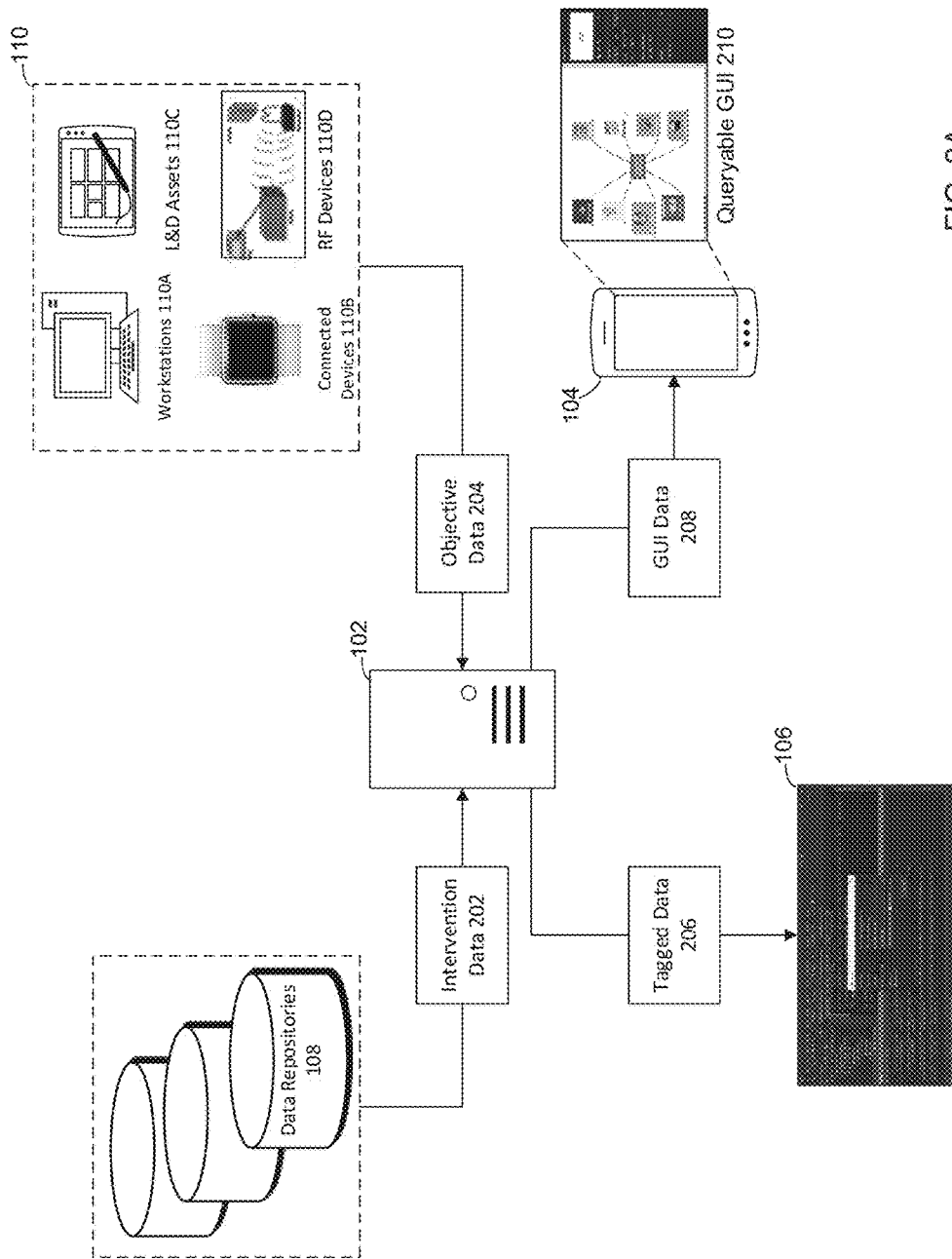
FIGS. 2A and 2B is a diagram illustrating an exemplary exchange of data that facilitates an objective characterization of an impact of an intervention, consistent with the disclosed embodiments.

FIG. 2A is a diagram illustrating an exemplary exchange of data between components of system 100, in accordance with disclosed embodiments. By way of example, and using any of the exemplary processes described above, computing system 102 may establish a secured communications session with data repositories 108 across network 122 (e.g., secure hypertext transfer protocols (HTTPS), etc.), and may receive, from data repositories 108, data identifying one or more interventions that involve individuals or groups of individuals within an enterprise (e.g., intervention data 202). As described above, the one or more interventions may include purposeful actions (e.g., initiated by the individual, the group, and/or related entities) and/or non-purposeful actions that impact a behavior of the individual or group, and intervention data 202 may include, but is not limited to, information that identifies the interventions, a time or date of the intervention, and those individuals or groups of individuals impacted by the interventions.

For instance, the enterprise may correspond to a warehouse operation within which employees fill customer orders, and intervention data 202 may identify an intervention corresponding to a change in a layout of inventory within a portion of the warehouse (e.g., as established by the ERM system) and one or more additional interventions that correspond to different training programs that describe the changed layout to various shifts of employees (e.g., as managed by the LMS platform maintained by the enterprise). In other instances, and consistent with the disclosed embodiments, intervention data 202 may identify an intervention corresponding to a change in an operational setting within the warehouse, such as an establishment of a thermostat setting at 72° F. Intervention data 202 may, for example, also identify the times and dates corresponding to the layout change, the training programs, and/or the established thermostat setting, and may identify each of the employees that attended the training programs (e.g., through corresponding identifiers established by the LMS platform).

The disclosed embodiments are, however, not limited to these exemplary interventions, and in other aspects, intervention data 202 may identify any additional or alternate purposeful or non-purposeful intervention appropriate to the enterprise and/or the involved individuals or groups. Further, in other embodiments, intervention data 202 may include any additional or alternate information characterizing the identified interventions that would appropriate to the identified interventions and to components of system 100.

In additional aspects, and using any of the exemplary processes described above, computing system 102 may establish a secured communication session with devices 110 across network 122 (e.g., secure hypertext transfer protocols (HTTPS), etc.), and may receive, from devices 110, data indicative of a location, performance, physical condition, or ambient environment of one or more individuals or groups of individuals within the enterprise (e.g. objective data 204). In certain aspects, portions of objective data 204 may be indicative of an interaction between the individuals and/or groups and one or more of devices 110 (e.g., workstations 110A and/or L&D assets 110B), which may be captured by devices 110 at various temporal intervals using any of the exemplary techniques described above. In other aspects, and as described above, at least a portion of objective data 204 may include time-varying location, environmental, and/or biometric data collected by corresponding sensors and/or RFID scanners included within one or more of devices 110 (e.g., IoT connected devices 110B and/or RF devices 110D).

For example, as described above, the enterprise may correspond to a warehouse operation within which employees fill customer orders, and portions of objective data 204 may include, but are not limited to, locations of locations of inventory throughout the warehouse at various points in time, a time-varying progress of fulfilled customer orders, and/or time varying locations of employees as these employees perform their duties throughout a daily shift at the warehouse (e.g., as captured by location sensors included within IoT connected devices 110B and/or determined by RF devices 110D). Further, in additional aspects, portions of objective data 204 may identify a time-varying ambient temperature at various locations throughout the warehouse (e.g., as captured using environmental sensors included within IoT connected devices 110B), and additionally, may include biometric data, such as a time-varying body temperature, of employees across multiple daily shifts (e.g., as captured using biometric sensors included within IoT connected devices 110B). The disclosed embodiments are, however, not limited to the exemplary objective data described above, and in other aspects, objective data 204 may include any additional or alternate data detectable by devices 110 and indicative of an impact of the one or more interventions on the individuals or groups within the enterprise.

In certain aspects, one or more of data repositories 108 may provide or "push" portions of intervention data 202 to computing system 102 at predetermined intervals (e.g., hourly, daily, weekly, etc.). For example, the LMS platforms, ERM platforms, and/or social media systems (e.g., that maintain data repositories 108) may regularly store updated LMS, ERM, and social-media data within corresponding ones of data repositories 108. In some aspects, data repositories 108 may aggregate the updated LMS, ERM, and social-media data to generate portions of intervention data 202, which may be transmitted in batch form to computing system 102 at the predetermined intervals. Similarly, in some aspects, one or more of devices 108 may continuously collect data indicative of a time-varying activity, location, environmental condition, and/or physical conditions of or experienced by the individuals or groups of individuals within the enterprise, and may aggregate the collected data as portions of objected data 204, which may be transmitted to computing system 102 at the predetermined intervals.

The disclosed embodiments are, however, not limited to processes that transmit intervention data and/or objective data in batch form to computing system 102 at predetermined intervals. In other aspects, and consistent with the disclosed embodiments, data repositories 108 and/or devices 110 may transmit corresponding portions of intervention data 202 and objective data 204 to computing system 102 in response to a detected occurrence of one or more specified events. For example, one or more of data repositories 108 may store updated LMS, ERM, and social-media data (e.g., as generated by the LMS platforms, ERM platforms, and/or social media systems), and upon receipt from the LMS platforms, ERM platforms, and/or social media systems, may transmit portions of the updated data to computer system 102 as intervention data 202. In further aspects, consistent with the disclosed embodiments, data repositories 108 and/or devices 110 may transmit corresponding portions of intervention data 202 and objective data 204 to computing system 102 in response to requests received from computing system 102 across network 122 (e.g., computing system 102 may poll data repositories 108 and/or devices 110 to obtain corresponding portions of intervention data 202 and objective data 204).

As described above, and consistent with the disclosed embodiments, computer system 140 may execute one or more application programs that generate and visualize an objective characterization of an impact of an intervention within an enterprise. In some aspects, computer system 102 may, upon execution of the one or more application programs, establish a secure application programming interface (API) through which computer system 102 may receive portions of intervention data 202 and objective data 204. For example, the systems that maintain one or more of data repositories 108 (e.g., the LMS platforms, the ERM systems, the social-media systems, etc.) may execute applications that establish the secure communication session with computing system 102 through the API and further, transmit portions of intervention data 202 to computer system 102 through the API (e.g., using any of the communications protocols outlined above). Similarly, in some instances, one or more of devices 110 (e.g., connected device 110C, RF devices 110D, etc.) may execute applications that establish the secure communication session with computing system 102 through the API and transmit portions of objective data 204 to computer system 102 through the API (e.g., using any of the communications protocols outlined above).

Additionally, in some aspects, computing system 102 may receive the portions of intervention data 202 and objective data 204 in data formats native to one or more of data repositories 108 and device 110. In an embodiments, computing system 102 may assign a unique identifier (e.g., a tag) to the received portions of intervention data 202 and objective data 204. The tag assigned to a particular portion of received data may include, but is not limited to, a source tag indicative of a source of the received data portion (e.g., a tag indicating that the received data portion originated from the LMS platform), a data-type tag indicative of a data type the characterizes the received data portion (e.g., a tag indicative of biometric data within a portion of objective data 204), a tag identifying an individual or group associated with the received data portion (e.g., a tag identifying an individual associated with a particular IoT connected device that captured the received data portion), and any additional or alternate tag or identifier capable of identifying and differentiating each portion of intervention data 202 and objective data 204 received by computing system 102 (e.g., unique numerical identifiers, embedded temporal data, etc.).

Computer system 102 may perform operations that attach the assigned tag to the received portions of intervention data 202 and objective data 204 (e.g., by appending or prepending the assigned tag to the received data portions) without modifying the native data formats of the intervention data 202 and objective data 204. Computer system 102 may, in further aspects, provide the tagged portions of intervention data 202 and objective data 204 (e.g., tagged data 206) to data lake 106 for storage and additional processing. In some instances, described above, data lake 106 may include a processing engine configured to format, structure, and/or perform analytical operations on portions of the tagged intervention and objective data (e.g., portions of tagged data 206) in response to request and/or queries from computer system 102. For example, data lake 106 may corresponding to a Microsoft Azure Data Lake™, and computing system 102 may transmit portions of tagged data 106 across network 122 to data lake 106 using any of the exemplary communications described above (e.g., through a secure API established by computing system 102 and/or the processing engine of data lake 106).

Further, in certain embodiments, computing system 102 may perform operations that establish profile data that links the received portions of intervention data 202 and objective data 204 to the individuals or groups impacted by the one or more identified interventions (e.g., as identified within intervention data 202). In some instances, the impacted individuals (and/or groups of individuals) may be assigned unique identifiers by each of the systems that generate intervention data 202 and maintain data repositories 108 (e.g., the LMS platforms, ERM systems, and/or social-media systems described above), and further, by one or more of devices 110 (e.g., the impacted individuals may be assigned unique authentication credentials to access workstations 110A and L&D systems 110D). In additional instances, the impacted individuals may possess, be assigned and/or be associated with various combinations of devices 108 (e.g., a particular impacted individual may operate a RFID scanner and may be assigned a particular wearable device with integrated biometric sensors). Thus, portions of intervention data 102 and objective data 204 may reference distinct identifiers that, in some aspects, represent the same impacted individual.

In certain aspects, the profile data generated on behalf of each impacted individual (e.g., by computer system 102) may specify the one or more identifiers that represent the impacted individual within intervention data 202 and objective data 204 (e.g., a corresponding LMS identifier, an ERM identifier, a social-media handle, a workstation authentication, etc.) and further, may identify the subset of devices 110 possessed by, assigned to, and/or associated with the impacted individual. The profile data for each impacted individual may also include holistic data identifying one or more of the interventions associated with the impacted individual (e.g., LMS training programs in which the impacted individuals participated, changes in warehouse configuration during the impacted individual's shift, vacations scheduled by the impacted individual, etc.).

The profile data may, in certain aspects, establish and preserve an electronic footprint that links portions of intervention data 102 and objective data 204 to each impacted individual, and computer system 102 may perform operations that store the established profile data locally or within data lake 106 using any of the exemplary processes described above. Further, computing system 102 may, in some aspects, perform operations that parse additional received portions of intervention data 202 and objective data 204 to identify additional impacted individuals, additional identifiers representative of the impacted individuals and additional ones of devices 110 possessed by, assigned to, and/or associated with the impacted individuals. Computing system 102, either alone or in conjunction with data lake 106, may perform operations that generate profile data for the newly identified impacted individuals, and additionally or alternatively, that update portions of the previously established profile data to specify the additional identifiers and the additional devices.

Additionally, as described above, a group of individuals may be impacted by the one or more interventions specified within intervention data 202. For example, the impacted individuals may each be assigned to work a common shift within a warehouse operations, and the disclosed embodiments may enable computing system 106 to establish group profile data linking the impacted group to corresponding portions of intervention data 202 and objective data 204. In certain aspects, computing system 102 and/or data lake 106 may establish the group profile data by identifying one or more individuals that constitute the impacted group (e.g., based on portions of intervention data 202 generated by an ERM system of the warehouse), and by generating profile data for each impacted individual using any of the exemplary techniques described above. Computing system 102 may, in some instances, generate the group profile data by merging, concatenating, or otherwise combining the profile data generated on behalf of the impacted individuals that constitute the group. Computer system 102 may store the generated group profile data and/or update the generate group profile data in response to newly received portions of intervention data 202 and objective data 204 using any of the exemplary techniques described above.

The disclosed embodiments may also provide a queryable graphical user interface (GUI) that, among other things, enables a user (e.g., a manager, consultant, etc.) to view objective performance data collected by devices throughout an enterprise, to characterize an impact of a particular intervention on that enterprise and further, to characterize and effectiveness of one or more candidate interventions in modifying the objective data. In some aspects, the queryable GUI may be rendered for presentation to a user by a corresponding client device (e.g., client device 104 of FIG. 1), and may include interface elements (e.g., drop-down menus, check boxes, text fields, etc.) that enable the user to query data lake 106 for objective data (e.g., biometric data, environmental data, performance data, etc.) associated with one or more particular interventions (e.g., training programs managed by the LMS platform, warehouse configurations established by the ERM platforms, etc.) that impact corresponding individuals or groups (e.g., individual employees, warehouse shifts, etc.).

In an embodiment, computing system 102 may establish queryable GUI data (e.g., GUI data 208) that identifies one or more candidate query parameters. For example, candidate query parameters consistent with the disclosed embodiments may include, but are not limited to, elements of objective data queryable within data lake 106 (e.g., based on objective data 204), one or more queryable interventions (e.g., as identified within intervention data 202), and one or more individuals or groups impacted by the queryable interventions (e.g., based on the generated profile data, intervention data 202, and/or objective data 204). Further, in certain aspects, computing system 102 may also include additional candidate query parameters within GUI data 208 that enable the user to refine a query based on locations and/or demographics of the objective data elements, interventions, and impacted individuals or groups. For instance, computing system 102 may include, within GUI data 208, candidate query parameters that enable the user to limit the query to objective data elements, interventions, and impacted individuals or groups associated with particular geographic areas and additionally or alternatively, to limit the query to particular demographic subsets of the impacted individuals or groups (e.g., to establish queries specific to certain sexes, ages, educational backgrounds, employment statuses, etc.). The disclosed embodiments are, however, not limited to these exemplary query parameters, and in other aspects, the queryable GUI may be customizable by the enterprise to include any additional or alternate query parameters appropriate to the enterprise and to tagged data 206.

Additionally, as described above, the queryable objective data elements may include raw, time-dependent objective data (e.g., ambient temperature at various temporal intervals, time dependent data indicative of a fulfillment of customer orders at the warehouse, etc.). In certain aspects, computer system 102 and/or data lake 106 may be capable of processing the raw, time-dependent objective data to generate various objective performance metrics that reflect an impact on an intervention on enterprise, and computer system 102 may include data identifying these objective performance metrics within GUI data 208. Objective performance metrics consistent with the disclosed embodiments may include, but are not limited to, average values of queryable objective data elements (e.g., average ambient temperatures within certain portions of a warehouse), aggregated values of the queryable objective data elements (e.g., total number of fulfilled orders across entire warehouse shifts, groups of employee, and/or individual employees), and various rates derived from the queryable objective data elements (e.g., a speed at which individual employees or groups fulfill customer orders). The disclosed embodiments are, however, not limited to these exemplary objective performance metrics, and in other aspects, GUI data 208 may include any additional objective performance metrics determinable by computing system 102 and/or data lake 106 and appropriate to the queryable objective data elements.

GUI data 208 may, in some instances, also include layout data indicative of a layout of the queryable GUI (e.g., when rendered by client device 104), a position of the interface elements within the queryable GUI, and/or an assignment of the queryable objective data elements, queryable interventions, impacted individuals or groups, and/or objective performance metrics to corresponding interface elements (e.g., drop-down menus, check boxes, etc.). In certain aspects, described in FIG. 2A, computing system 102 may transmit GUI data 208 across network 122 to client device 104 using any of the secure communication protocols outlined above (e.g., through an appropriate API maintained by an application executed by client device 104). Client device 104 may, in some aspects, receive GUI data 208, may render GUI data 208 for presentation, and may present a populated, queryable GUI (e.g., populated GUI 210) to the user through a corresponding display unit (e.g., a touch-screen display, etc.).

Additionally, as described above, computing system 102 may receive, across network 122 through the secure API, additional portions of intervention data 202 and objective data 204, which computer system 102 may tag and store within data lake 106. Computer system 102 may, for example, process the additional elements of intervention data 202 and objective data 204 (e.g., as received at specified intervals from data repositories 108 and devices 110), and identify additional elements of objective data, additional interventions, additional impacted individuals or groups, and/or additional objective performance metrics not included within or associated with the previously received portions of intervention data 202 and objective data 204. In some embodiments, computer system 102 may generate updated GUI data, which includes the additional objective data elements, interventions, impacted individuals or groups, and/or objective performance metrics, and transmit the updated GUI data to client device 104 for presentation to the user (e.g., using any of the exemplary techniques described above). In some aspects, the disclosed embodiments may adaptively generate and present a queryable GUI that provides the user with an increasingly diverse set of objective data with which to characterize and impact of one or more interventions within the enterprise.

By way of example, the user may administer an LMS platform maintained by the enterprise, which may correspond to a warehouse that fulfills customer orders for various articles. The enterprise may, for instance, modify an arrangement of inventory within the warehouse (e.g., to accommodate new inventory, etc.), and the LMS platform may develop two different training courses (e.g., associated with different LMS identifiers) to highlight the modified arrangement to warehouse employees. As described below, the disclosed embodiments may enable a user to query data lake 106 (e.g., through query parameters input to queryable GUI and transmitted to computing system 102) and obtain and visualize data that objectively characterizes an effect of each of the two training courses on a performance of various warehouse employees when operating under the modified inventory arrangement.

For example, the user may provide input to queryable GUI 210 (e.g., via client device 104) that specifies query parameters that include, but are not limited to, the two LMS training programs developed to address the modified inventory arrangement, geographic and/or demographic parameters of the impacted employees (e.g., a breakdown of employees in the United States, India, and Germany), and/or one or more desired objective performance metrics (e.g., an aggregate number of fulfilled customer orders and/or an average number of fulfilled customer orders per hour). In certain aspects, the user may specify the query parameters through a manipulation of one or more of the interface elements presented within queryable GUI 210, e.g., through a manipulation of populated drop-down menus or populated check-boxes, and/or through an entry of data (e.g., LMS identifiers of the two courses) within one or more text fields. This disclosed embodiments are, however, not limited to these exemplary query parameters, and in other aspects, queryable GUI 210 may include any additional or alternate query parameters appropriate to the data stored within data lake 106 and to the enterprise.

Figure 2B:
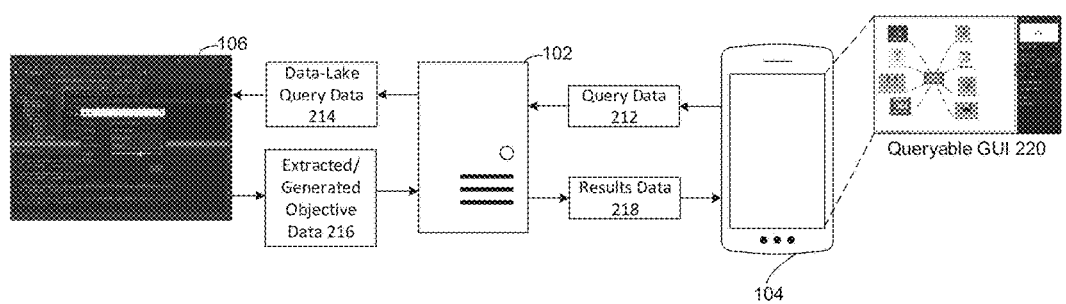

In some aspects, as illustrated in FIG. 2B, client device 104 may receive the query parameters, and may package the received query parameters into query data (e.g., query data 212) for transmission across network 122 to computing system 102 using any of the communications protocols outlined above. Computing system 102 may, for example, receive query data 212, may parse query data 212 to identify the specified interventions (e.g., the LMS identifiers of the LMS training programs), and based on the generated profile data, may establish groups of individual employees that participated in each of the specified LMS courses and further, that match the geographic and/or demographic parameters. In some instances, computer system 102 may generate a data-lake query that includes portions of received query data 202 (e.g., identifiers of the LMS training programs, geographical and/or demographic parameters, and objective performance metrics) and data identifying the impacted individual employees, and may transmit the generated data-lake query (e.g., query 214) across network 122 to data lake 106 (e.g., a Microsoft Azure Data Lake™) using any of the communications protocols outlined above.

Data lake 106 may receive data-lake query data 214, and a processing engine of data lake 106 may parse data-lake query data 214 to identify the one or more query parameters (e.g., the identifiers of the LMS training programs, geographical and/or demographic parameters, the impacted individual employees, and objective performance metrics). In certain aspects, the processing engine of data lake 106 perform analytical processes on portions of the stored data (e.g., portions of stored objective data 202 and intervention data 204) to extract and/or generate objective data consistent with data-lake query data 214.

For example, the processing engine of data lake 106 may access stored data indicative of time-varying numbers of customer orders fulfilled by employees across the enterprise. In some instances, the processing engine of data lake 106 may decompose portions of the accessed data into geographic-specific portions corresponding to impacted employees disposed within the specified geographic regions (e.g., the United States, Germany, and India), and may compute the desired performance metrics for each of the geographic-specific portions (e.g., an aggregate number of fulfilled customer orders and/or an average number of fulfilled customer orders per hour) over time period prior to and subsequent to the identified interventions (e.g., the two LMS training programs). For instance, the processing engine of data lake 106 may, based on the LMS identifiers of the training programs, identify times and/or dates on which the impacted individuals participated in the training programs (e.g., based on portions of intervention data 202 stored by data lake 106), and compute the desired performance metrics for each of the geographic-specific portions prior to and subsequent to the determined times and/or dates of participation. In some aspects, data lake 106 may transmit the generated and/or extracted portions of the objective data (e.g., extracted and/or generated objective data 216) across network 122 to computing system 102.

The disclosed embodiments are, however, not limited to analytical processes performed on portions of stored intervention and objective data by the processing engine of data lake 106. In other instances, and consistent with the disclosed embodiments, the processing engine of data lake 106 may access the stored data indicative of time-varying numbers of customer orders fulfilled by employees across the enterprise and the participation times and/or dates, and may transmit portions of the access data across network 122 to computing system 102, which may be configured to perform the analytical processes to decompose the stored data in accordance with the specific geographic and/or demographic parameters, and compute the desired objective performance metrics using any of the exemplary techniques described above.

Computing system 102 may, for example, repackage extracted and/or generated objective data 216 as result data consistent with the user's query (e.g., result data 218), which computing system 102 may transmit across network 122 to client device 104 (e.g., through a corresponding API maintained by application executed by client device 104). In some aspects, client device 104 may receive results data 218, and may render portions of received results data 218 for presentation within populated GUI 220 (e.g., through a corresponding display unit, such as a touch-screen display).

FIG. 2C illustrates an exemplary configuration of queryable GUI 220 (and additionally or alternatively, queryable GUI 210), in accordance with the disclosed embodiments. For example, as illustrated in FIG. 2C, GUI 220 may include a query specification region 222 and a data presentation region 224. Query specification region may, for example, include various interface elements (e.g., drop-down menus 222A-222D and text input region 222E) that enable the user's specification and/or modification of any of the query parameters describe above (e.g., particular interventions, impacted individuals or groups, objective performance metrics, geographic and/or demographic parameters, etc.). Further, client device 104 may present graphical representations (e.g., bar graphs, pie charts, etc.) of portions of results data 218 within data presentation region 224.

For example, populated GUI 220 may present, to the user, total numbers of orders fulfilled per warehouse shift by participating employees disposed in the United States, Germany, and India prior to and subsequent to each of the two LMS training programs (e.g., within data presentation region 224 of FIG. 2C). Further, in some instances, populated GUI 220 may also present, to the user, speeds at which participating employees filled customer orders in the United States, Germany, and India prior to and subsequent to each of the two LMS training programs. The disclosed embodiments are not limited to these exemplary performance metrics, and in other aspects, populated GUI 220 may be configured to present to the user any additional or alternate data or objective performance metric appropriate to the stored intervention and objective data, data lake 106, and computing system 102.

In some aspects, the presented portions of results data 106 may enable the user to objectively characterize an effectiveness of each of the two LMS training programs on customer-order fulfillment by warehouse employees in the United States, in Germany, and in India. For instance, the user may determine that warehouse employees in the United States, Germany, and India filled a larger number of customer orders per shift, and at a faster rate (e.g., on a per-hour basis) after participating in the second of the two LMS training programs than after participating in the first of the two LMS training programs. The user may, in some instances, determine that the first LMS training program should be discontinued, and that the second LMS training program should be adopted for use in all future employee training. By characterizing the effectiveness of the two interventions (e.g., LMS training programs) using objective data collected by sensor-driven devices, the disclosed embodiments may reduce a likelihood that subjective personal or enterprise-based considerations (e.g., a user's investment of time in one of the programs, or the enterprise's investment of funds in one of the LMS training programs) cloud the analysis of the impact of the interventions.

Additionally, in certain aspects, the user may gain additional insights on the effectiveness of the identified interventions across the enterprise. For example, by viewing the objective data presented within populated GUI 220, the user may determine that while the speed at which employees in India filled customer orders increased after participating in the second of the two LMS programs, the increase in speed was smaller than that experienced by employees in the United States and Germany. The user may, in some instances, be prompted to take additional action to review and "tweak" portions of the second LMS training program to increase its effectiveness with employees disposed in India.

As described above, the disclosed embodiments may enable a computing system (e.g., computing system 102) to present, to a user through a client device (e.g., client device 104), a queryable GUI (e.g., GUI 210) that enables the user query a data lake (e.g., data lake 106) for stored objective data indicative of an impact of one or more interventions within an enterprise. Computer system 102 may, in some aspects, provide portions of the stored objective data that are consistent with the query to client device 104 (e.g., results data 218), which may be presented to the user through the GUI (e.g., GUI 220), and which may enable the user's objective characterization of the interventions' impact based on various performance metrics.

The disclosed embodiments are, however, not limited to a queryable GUIs that present objective data to the user in response to a user-generated query (e.g., based on query specification region 222 of queryable GUIs 210 and 220). In other aspects, and consistent with the disclosed embodiments, computer system 102 may populate queryable GUIs 210 and 220 with portions of time-varying objective data 204 (and/or intervention data 202) without or in advance of receiving query data (e.g., query data 212) from client device 104. For instance, by provisioning queryable GUIs 210 and/or 220 with time-varying objective and/or intervention data, the user may be able to view a temporal or geographic variation in the collected objective data and may identify trends in that collected objective data without actively querying data lake 106.

For example, as described above, portions of objective data 202 may include time-varying performance data of individual employees over a workday (e.g., running totals of fulfilled customer orders) and time-varying biometric data indicative of physical conditions of individual employees over the workday (e.g., as collected by one or more of IoT connected devices 110B). In some aspects, queryable GUIs 210 and 220 may be customizable to meet the needs of a particular enterprise (e.g., a warehouse operation), and may be configured to present combinations of the time-varying performance data (e.g., total numbers of customer orders fulfilled by one or more employees) and the time-varying biometric data (e.g., employee body temperatures) without or prior to receiving a query from the user. For instance, computing system 102 may identify tagged portions of objective data 204 (e.g., tagged data 206 of FIG. 2A) that correspond to the combinations of time-varying performance and biometric data, and incorporate the tagged portions of objective data 204 into GUI data 208, which may be transmitted to client device 104 across network 220.

In certain instances, client device 104 may extract the time-varying performance and/or biometric data from GUI data 208, and present the time varying performance and/or biometric data to the user within a corresponding portion of the queryable GUI (e.g., data presentation region 224) automatically and without input from the user. In certain aspects, by presenting the combinations of time-varying performance and biometric data, the user may identify and explain partially one or more trends in the performance data (e.g., the user may identify correlations between reductions in employee performance and increases in employee body temperature), and may establish and implement one or more interventions to mediate the reduction in the performance data (e.g., a reduction in a thermostat setting in a warehouse).

Further, in additional embodiments, computer system 102 (e.g., alone or in conjunction with data lake 106) may apply one or more machine learning algorithms to the received portions of intervention data 202 and objective data 204 to identify trends within objective data 204 (e.g., trends in performance data, trends in biometric data, etc.) and to propose, with user input, candidate interventions to address the identified trends. For example, and as described above, intervention data 202 may identify, within a particular warehouse, an arrangement of walkways (e.g., routes taken by individuals) and/or motorways (e.g., routes taken by forklifts and shop trucks), and additionally or alternatively, a thermostat setting at various locations throughout the warehouse (e.g., based on data established or maintained by an ERM platform). Further, by way of example, objective data 204 may include data identifying a time-varying location of one or more employee within the warehouse, data identifying a time-varying performance of employees working throughout the warehouse (e.g., based on performance metrics that include, but are not limited to, numbers of fulfilled customer orders, speeds at which customer orders are fulfilled, etc.), and further, biometric data indicative of time-varying temperatures experienced by employees working throughout the warehouse (e.g., as captured by one or more of IoT connected devices 110B).

In some aspects, and without user input, computing system 102 may apply one or more machine learning algorithms to intervention data 202 and objective data 204 to determine that a performance (e.g., as measured by an average number of fulfilled customer orders) of employees disposed within the warehouse at location proximate to one or more of the motorways decreases by between 25% and 50% between 2:00 p.m. and 5:00 p.m. daily, and further, that an average temperature experienced by these employees ranges from 80° F. to 85° F. In certain aspects, consistent with the disclosed embodiments, computer system 102 may generate trend data indicative of the detected reduction in performance of and the accompany range of temperatures experienced by warehouse employees disposed proximate to the one or more motorways. Computer system 102 may, in some instances, transmit the generated trend data to client device 104 across network 122 using any of the communications protocols described above. In other instances, and consistent with the disclosed embodiments, computer system 102 append or combine the generated trend data with additional data that establishes, updates, and/or populates the queryable GUI (e.g., GUI data 208), which may be transmitted to client device 104 using any of the exemplary techniques described above.

Client device 104 may, in some aspects, receive the transmitted trend data (e.g., alone or in combination with other data), and present portions of the transmitted trend data with the queryable GUI (e.g., GUIs 210 and/or 220) without input from the user. For instances, within a portion of GUIs 210 and/or 220 (e.g., within data presentation region 224 of FIG. 2C), client device may present a graphical and/or textual indication that the performance of employees disposed proximate to the one or more motorways decreases by between 25% and 50% between 2:00 p.m. and 5:00 p.m. daily, and further, that the average temperature experienced by these employees ranges from 80° F. to 85° F.

Additionally, in some aspects, the machine-learning algorithms implemented by client device 102 may analyze portions of intervention data 202 and objective data 204 (e.g., as stored within data lake 106) to identify one or more candidate interventions that address the identified trends, including the 25% to 50% reduction in employee performance between 2:00 p.m. and 5:00 p.m. and the corresponding increase in ambient temperature described above. For instance, computing system 102 may apply the one or more machine-learning algorithms to the stored portions of intervention data 202 and objective data 204, may establish that prior interventions associated with a reduction in thermostat settings and/or increases in volumetric air flow are likely to locally reduce temperatures experienced by employees within the warehouse. Further, and based on the application of the one or more machine-learning algorithms to the stored portions of intervention data 202 and objective data 204, computing system 102 may establish that an increase in a separation between foot traffic and motorways increased employee performance and resulted in a decrease in the ambient temperature experienced by these employees.

Based on the outcomes of the machine-learning algorithms described above, computing system 102 may establish candidate interventions that include, but are not limited to, maintaining the current warehouse configuration while reducing thermostat settings and/or increasing air flow in those portions of the warehouse in which employees are disposed proximate to motorways, and reconfiguring a layout of the warehouse to increase a separation between employee foot traffic and motorways while maintaining current thermostat and air-handling settings. In certain aspects, consistent with the disclosed embodiments, computer system 102 may generate data indicative of the candidate interventions, which may be transmitted with the generated trend data to client device 104 across network 122 using any of the communications protocols described above. In other instances, and consistent with the disclosed embodiments, computer system 102 append or combine the generated trend and candidate-intervention data with additional data that establishes, updates, and/or populates the queryable GUI (e.g., GUI data 208 and/or results data 218), which may be transmitted to client device 104 using any of the exemplary techniques described above.

In some aspects, client device 104 may receive the transmitted trend and candidate-intervention data (e.g., alone or in combination with other data), and present at least a portion of the identified trends and at least a portion of the established candidate interventions within the queryable GUI (e.g., within data presentation region 224 of GUIs 210 and/or 220) without input from the user. In other aspects, client device 104 may present all or a portion of the identified trends and established candidate interventions within an additional interface element (e.g., a pop-up window) that obscures a portion of GUI 210 and/or 220 (e.g., that obscures a portion of query specification region 222 while allowing the user to view data within data presentation region 224).

By detecting trends within intervention data 202 and objective data 204 and provided candidate interventions, the disclosed embodiments may highlight objectively-derived "bright spots" within the collected data, which may be exploited by the user to improve or enhance not only employee performance across the enterprise, but also a quality and impact of interventions (e.g., LMS training programs etc.) implemented across the enterprise. Further, and as described above, the disclosed embodiments may enable the user to objectively identify an impact of an intervention (e.g., a purposeful or non-purposeful action) on a performance of various individuals or group of individuals within the enterprise without the collective biases that often cloud conventional analytical techniques.

Figure 3:
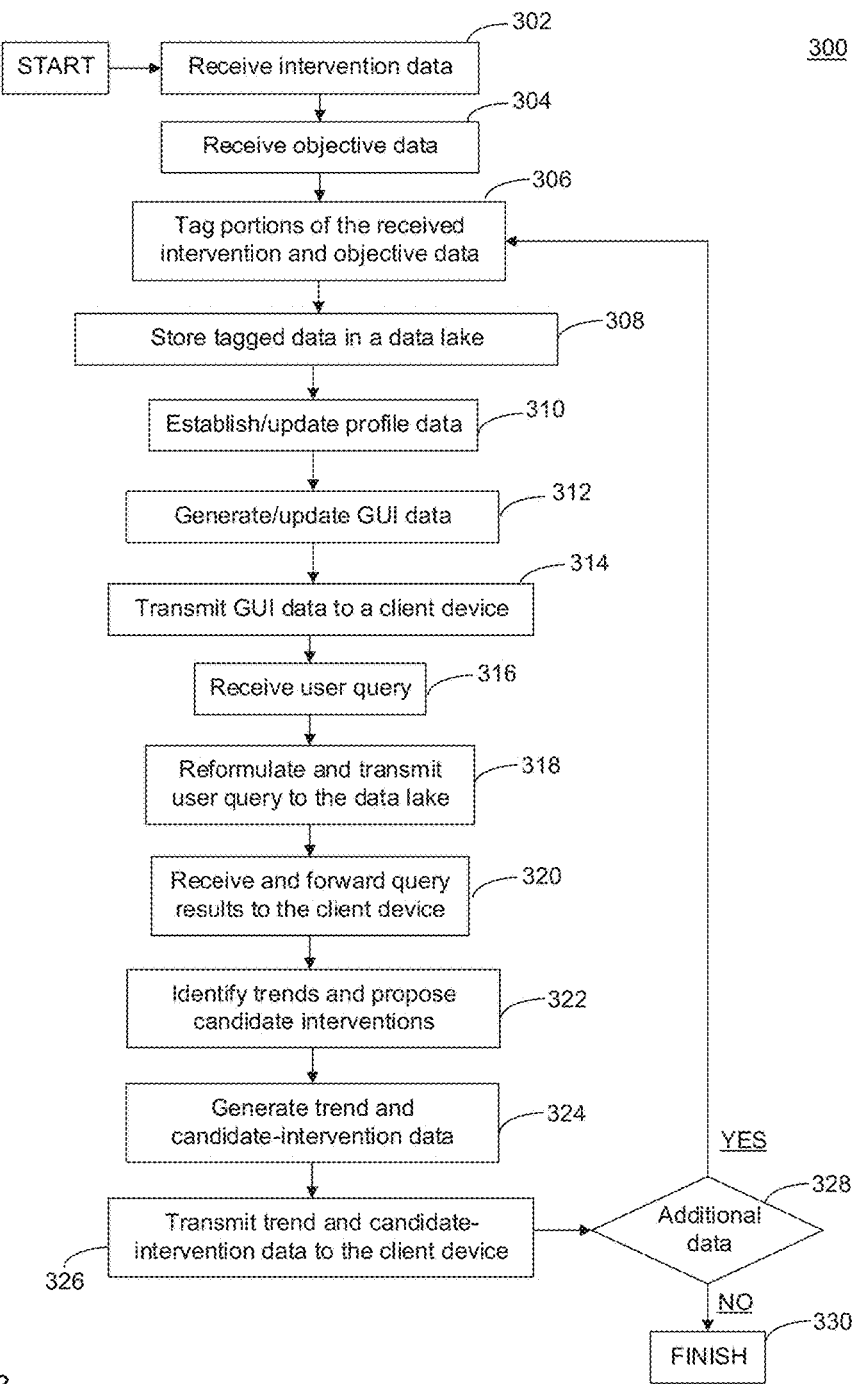
FIG. 3 is a flowchart of an exemplary process for objectively characterizing impacts on interventions, consistent with the disclosed embodiments.

FIG. 3 is a flowchart of an exemplary process 300 for objectively characterizing an impact of one or more interventions on individuals or groups of individuals, in accordance with the disclosed embodiments. In certain aspects, a computer system (e.g., computing system 102) may perform the steps of exemplary process 300, which may enable computing system 102 to obtain and store intervention objective data in an appropriate data repository or data lake (e.g., data lake 106), generate queryable graphical user interfaces (GUIs) that enable a user (e.g., through client device 104) to query data lake 106 and obtain objective metrics indicative of an impact an intervention on individuals or groups of individuals. Additionally or alternatively, the steps of exemplary process 300, when performed by computer system 102, may enable computer system 102 to detect trends within portions of the stored intervention and objective data, establish candidate interventions that mediate or exploit the detected trends, and that provide the detected trends and the established candidate interventions to the user (e.g., via client device 104) without user input or request.

In some aspects, computing system 102 may establish a secured communications session with data repositories 108 across network 122 (e.g., using a corresponding application programming interface (API)), and may receive intervention data (e.g., intervention data 202 of FIG. 2A) identifying one or more interventions that involve individuals or groups of individuals within an enterprise from data repositories 108 across network 122 (e.g., in step 302). As described above, interventions consistent with the disclosed embodiments may include purposeful actions (e.g., initiated by the individual, the group, and/or related entities) and/or non-purposeful actions that impact a behavior of the individual or group, and the received intervention data may include, but is not limited to, information that identifies the interventions, a time or date of the intervention, and those individuals or groups of individuals impacted by the interventions.

Additionally, computing system 102 may establish a secured communication session with devices 110 across network 122 using any of the exemplary processes described above (e.g., through a corresponding secure API). In some aspects, computer system 102 may receive, from devices 110, objective data (e.g. objective data 204 of FIG. 2A) indicative of a time-varying location, performance, physical condition, or ambient environment of one or more individuals or groups of individuals within the enterprise (e.g., in step 304). In certain aspects, portions of the received objective data may be identify an interaction between the individuals and/or groups and one or more of devices 110 (e.g., workstations 110A and/or L&D assets 110B), which may be captured by devices 110 at various temporal intervals using any of the exemplary techniques described above. In additional aspects, and as described above, at least a portion of objective data 204 may include time-varying location, environmental, and/or biometric data collected by corresponding sensors and/or RFID scanners included within one or more of devices 110 (e.g., IoT connected devices 1106 and/or RF devices 110D).

As described above, computing system 102 may receive the portions of intervention data (e.g., in step 302) and objective data (e.g., in step 304) in data formats native to corresponding ones of data repositories 108 and device 110. In certain aspects, computer system 102 may assign unique identifiers or tags to the received intervention and objective data without modifying their respective native file formats (e.g., in step 306). For example, computing system 102 may tag the received intervention and/or objective data by appending or prepending the unique identifier to portions of the received intervention and/or objective data. Further the unique identifier assigned to a particular portion of received intervention and/or objective data may include, but is not limited to, a source tag indicative of a source of the received data portion, a data-type tag indicative of a data type the characterizes the received data portion, a tag identifying an individual or group associated with the received data portion, and any additional or alternate tag or identifier capable of identifying and differentiating each portion of the intervention and objective data received by computing system 102 (e.g., unique numerical identifiers, embedded temporal data, etc.).

In some aspects, computing system 102 may perform operations that store the tagged intervention and/or objective data in their native file formats within portions of data lake 106 (e.g., in step 308). For example, data lake 106 may correspond to a Microsoft Azure Data Lake™, and computing system 102 may transmit portions of tagged intervention and objective data across network 122 to data lake 106 using any of the exemplary communications described above (e.g., through a secure API established by computing system 102 and/or the processing engine of data lake 106).

In step 310, computing system 102 may perform operations that establish and/or update profile data that links the portions of the received intervention and objective data to the individuals or groups impacted by the one or more interventions (e.g., identified within intervention data 202). In some instances, the impacted individuals (and/or groups of individuals) may be assigned unique identifiers by each of the systems that generate the intervention data and maintain data repositories 108 (e.g., the LMS platforms, ERM platforms, and/or social-media systems described above), and further, by one or more of devices 110 (e.g., the impacted individuals may be assigned unique authentication credentials to access workstations 110A and L&D systems 110D). In additional instances, the impacted individuals may possess, be assigned, and/or be associated with various combinations of devices 108 (e.g., a particular impacted individual may operate a RFID scanner and may be assigned a particular wearable device with integrated biometric sensors). Portions of the received intervention and objective data may, in some instances, reference distinct identifiers that, in some aspects, represent the same impacted individual.

In certain aspects, as described above, the profile data generated on behalf of each impacted individual (e.g., by computer system 102 in step 310) may specify the one or more identifiers that represent the impacted individual within the received intervention and objective data (e.g., a corresponding LMS identifier, an ERM identifier, a social-media handle, a workstation authentication, etc.) and further, may identify the subset of devices 110 possessed by, assigned to, and/or associated with the impacted individual. The profile data for each impacted individual may also include holistic data identifying one or more interventions associated with the impacted individual (e.g., LMS training programs in which the impacted individuals participated, changes in warehouse configuration during the impacted individual's shift, vacations scheduled by the impacted individual, etc.).

Additionally, as described above, a group of individuals may be impacted by the one or more interventions specified within the received intervention data, and in certain aspects, computing system 102 may establish and/or update group profile data in step 310 by identifying one or more individuals that constitute the impacted group (e.g., based on portions of the received intervention data generated by an ERM platform of the warehouse), and by generating profile data for each impacted individual using any of the exemplary techniques described above. Computing system 102 may, in some instances, generate the group profile data by merging, concatenating, or otherwise combining the profile data generated on behalf of the impacted individuals that constitute the group. Computer system 102 may store the newly established or updated group profile data using any of the exemplary techniques described above.

Further, and as described above, the disclosed embodiments may also provide a queryable graphical user interface (GUI) that, among other things, enables a user to view objective performance metrics collected by devices throughout an enterprise, to characterize an impact of a particular intervention on that enterprise and further, to characterize an effectiveness of one or more candidate interventions in modifying one or more of the objective performance metrics. In some aspects, the queryable GUI may be rendered for presentation to the user by a corresponding client device (e.g., client device 104 of FIG. 1), and may include interface elements (e.g., drop-down menus, check boxes, text fields, etc.) that enable the user to query data lake 106 for objective data (e.g., biometric data, environmental data, performance data, etc.) associated with one or more particular interventions (e.g., training programs managed by the LMS platform, warehouse configurations established by the ERM platforms, etc.) that impact corresponding individuals or groups.

In an embodiment, computing system 102 may generate and/or update GUI data (e.g., GUI data 208 of FIG. 2A) that specifies one or more candidate query for parameters for display within the queryable GUI (e.g., in step 312). For example, candidate query parameters consistent with the disclosed embodiments include, but are not limited to, elements of objective data queryable within data lake 106, specific interventions identified within data lake 106, individuals or groups impacted by the specific interventions, and additional query parameters that enable the user to refine a query based on locations and/or demographic characteristic associated with the objective data elements, interventions, and impacted individuals or groups. For instance, these additional query parameters may enable the user to limit a query to objective data elements, interventions, and impacted individuals or groups associated with particular geographic areas and additionally or alternatively, to limit the query to particular demographic subsets of the impacted individuals or groups (e.g., to establish queries specific to certain sexes, ages, educational backgrounds, employment statuses, etc.). The disclosed embodiments are, however, not limited to these exemplary query parameters, and in other aspects, the queryable GUI may be customizable by the enterprise to include any additional or alternate query parameters appropriate to the enterprise and to the stored intervention and/or objective data.

Additionally, as described above, the objective data elements may include raw, time-dependent objective data (e.g., ambient temperature at various temporal intervals, time dependent data indicative of a fulfillment of customer orders at the warehouse, etc.). In certain aspects, computer system 102 may be capable of processing the raw, time-dependent objective data to generate various objective performance metrics that reflect an impact on an intervention on enterprise, and computer system 102 may include data identifying these available objective performance metrics within the GUI data generated in step 312.

Objective performance metrics consistent with the disclosed embodiments may include, but are not limited to, average values of queryable objective data elements (e.g., average ambient temperatures within certain portions of a warehouse), aggregated values of the queryable objective data elements (e.g., total number of fulfilled orders across entire warehouse shifts, groups of employees, and/or individual employees), and various rates derived from the queryable objective data elements (e.g., a speed at which individual employees or groups fulfill customer orders). The disclosed embodiments are, however, not limited to these exemplary objective performance metrics, and in other aspects, the GUI data may include any additional objective performance metrics determinable by computing system 102 and/or data lake 106 and appropriate to the queryable objective data elements. Further, as described above, computing system 102 may include, within the GUI data, parameters indicative of a layout of the queryable GUI (e.g., when rendered by client device 104), a position of the interface elements within the queryable GUI, and/or an assignment of the objective data elements, interventions, impacted individuals or groups, and/or objective performance metrics to corresponding interface elements (e.g., drop-down menus, check boxes, etc.).

Computing system 102 may, in some aspects, transmit the GUI data across network 122 to client device 104 using any of the secure communication protocols outlined above (e.g., in step 314). Client device 104 may, in some aspects, receive and render the GUI data for presentation, and may present a populated, queryable GUI (e.g., populated GUI 210 of FIG. 2A) to the user through a corresponding display unit (e.g., a touch-screen display, etc.). As described above, the user may provide input specifying one or more query parameters that include, but are not limited to, particular interventions (e.g., LMS training programs developed to address a modified warehouse configuration), geographic and/or demographic parameters of impacted employees (e.g., a breakdown of impacted employees in the United States, India, and Germany), and/or one or more desired objective performance metrics (e.g., an aggregate number of fulfilled customer orders and/or an average number of fulfilled customer orders per hour). In certain aspects, the user may specify the query parameters through a manipulation of one or more of the interface elements presented within the queryable GUI, e.g., through a manipulation of populated drop-down menus or populated check-boxes, and/or through an entry of data (e.g., LMS identifiers of the courses) within one or more text fields. The disclosed embodiments are, however, not limited to these exemplary query parameters, and in other aspects, the queryable GUI may include any additional or alternate query parameters appropriate to the data stored within data lake 106 and to the enterprise.

Client device 104 may, in some aspects, receive the query parameters, and package the query parameters into query data (e.g., query data 212 of FIG. 2B) for transmission across network 122 to computing system 102 using any of the communications protocols outlined above. Computing system 102 may, for example, receive the query data from client device 104 (e.g., in step 316), and based on the received query data, may formulate and submit an appropriate query (e.g., data-lake query data 214 of FIG. 2B) to data lake 106 (e.g., in step 318). For instance, in step 318, computer system 102 may parse the received query data to identify the specified interventions (e.g., LMS identifiers of the LMS training programs), and based on the generated profile data, may establish groups of individual employees that participated in each of the specified LMS training programs and further, are consistent with the geographic and/or demographic parameters. In some instances, computer system 102 may generate the appropriate data-lake query by combining portions of the received query data (e.g., identifiers of the LMS training programs, geographical and/or demographic parameters, and objective performance metrics) and data identifying the impacted individual employees, and may transmit the appropriate data-lake query across network 122 to data lake 106 using any of the communications protocols outlined above.

As described above, data lake 106 may receive the query, and a processing engine of data lake 106 may parse query 214 to identify the one or more query parameters (e.g., the identifiers of the LMS courses, geographical and/or demographic parameters, the impacted individual employees, and objective performance metrics). In certain aspects, the processing engine of data lake 106 may perform analytical processes on portions of the stored data (e.g., portions of stored objective data 202 and intervention data 204) to extract and/or generate objective data consistent with the received data-lake query.

For example, the processing engine of data lake 106 may access stored data indicative of time-varying numbers of customer orders fulfilled by employees across the enterprise. In some instances, described above, the processing engine of data lake 106 may decompose portions of the accessed data into geographic-specific portions corresponding to impacted employees disposed within the specified geographic regions (e.g., the United States, Germany, and India), and may compute the desired performance metrics for each of the geographic-specific portions (e.g., an aggregate number of fulfilled customer orders and/or an average number of fulfilled customer orders per hour) over time period prior to and subsequent to the identified interventions (e.g., the two LMS training programs). Data lake 106 may transmit the generated and/or extracted portions of the objective data (e.g., extracted and/or generated objective data 216 of FIG. 2B) across network 122 to computing system 102.

Computing system 102 may, for example, receive the objective data consistent with the user query from data lake 106, and may forward portions of the received objective data (e.g., results data 218 of FIG. 2B) to client device 102 (e.g., in step 320). In other aspects, in step 320, computing device 108 may perform additional or alternate analytical processes on portions of the received objective data to decompose the objective data portion in accordance with the specific geographic and/or demographic parameters, and compute the desired objective performance metrics using any of the exemplary techniques described above.

In some aspects, client device 104 may receive the objective data, and may render portions of received objective data for presentation within the queryable GUI (e.g., populated GUI 220 of FIGS. 2B and 2C). For example, as described above, the queryable GUI may present, to the user, total numbers of orders fulfilled per warehouse shift by participating employees disposed in the United States, Germany, and India prior to and subsequent to each of the LMS training programs (e.g., within data presentation region 224 of FIG. 2C). Further, in some instances, populated GUI 220 may also present, to the user, speeds at which participating employees filled customer orders in the United States, Germany, and India prior to and subsequent to each of the two LMS training programs. The disclosed embodiments are not limited to these exemplary performance metrics, and in other aspects, queryable GUI 220 may be configured to present to the user any additional or alternate data or objective performance metric appropriate to the stored intervention and objective data, data lake 106, and computing system 102.

In additional embodiments, described above, computer system 102 may identify trends within objective data 204 and propose, without user input, candidate interventions to address the identified trends (e.g., in step 322). For example, and as described above, intervention data stored within data lake 106 may identify, within a particular warehouse, an arrangement of walkways (e.g., routes taken by individuals) and/or motorways (e.g., routes taken by forklifts and shop trucks), and additionally or alternatively, a thermostat setting at various locations throughout the warehouse (e.g., based on data established or maintained by an ERM platform). Further, by way of example, objective data stored within data lake 106 may include data identifying a time-varying location of one or more employee within the warehouse, data identifying a time-varying performance of employees working throughout the warehouse (e.g., based on performance metrics that include, but are not limited to, numbers of fulfilled customer orders, speeds at which customer orders are fulfilled, etc.), and further, biometric data indicative of time-varying temperatures experienced by employees working throughout the warehouse (e.g., as captured by one or more of IoT connected devices 110B).

In some aspects, and without user input, computing system 102 may apply one or more machine learning algorithms to the stored intervention objective data in step 322 to determine that a performance (e.g., as measured by an average number of fulfilled customer orders) of employees disposed within the warehouse at location proximate to one or more of the motorways decreases by between 25% and 50% between 2:00 p.m. and 5:00 p.m. daily, and further, that an average temperature experienced by these employees ranges from 80° F. to 85° F.

Additionally, in some aspects, the machine-learning algorithms implemented by client device 102 in step 322 may analyze portions of the stored intervention data objective data (e.g., as stored within data lake 106) to identify one or more candidate interventions that address the identified trends, including the 25% to 50% reduction in employee performance between 2:00 p.m. and 5:00 p.m. and the corresponding increase in ambient temperature described above. For instance, computing system 102 may apply the one or more machine-learning algorithms to the stored intervention and objective data, and may establish that prior interventions associated with a reduction in thermostat settings and/or increases in volumetric air flow are likely to locally reduce temperatures experienced by employees within the warehouse. Further, and based on the application of the one or more machine-learning algorithms to the stored intervention and objective data, computing system 102 may establish that an increase in a separation between foot traffic and motorways increased employee performance and resulted in a decrease in the ambient temperature experienced by these employees.

In certain aspects, consistent with the disclosed embodiments, computer system 102 may generate trend data indicative of the detected trends and candidate-intervention data indicative of the candidate interventions (e.g., in step 324). For example, the generated trend data may identify the detected reduction in performance of and the accompany range of temperatures experienced by warehouse employees disposed proximate to the one or more motorways. Further, by way of example, the generated candidate-intervention data may identify candidate interventions that include, but are not limited to, maintaining the current warehouse configuration while reducing thermostat settings and/or increasing air flow in those portions of the warehouse in which employees are disposed proximate to motorways, and reconfiguring a layout of the warehouse to increase a separation between employee foot traffic and motorways while maintaining current thermostat and air-handling settings. In certain aspects, computer system 102 may transmit portions of the generated trend data and the generated candidate-intervention data to client device 104 using any of the exemplary techniques described above (e.g., in step 326).

Client device 104 may, in some aspects, receive the transmitted trend data and the transmitted candidate-intervention data from computer system 102. In some aspects, client device 104 may present at least a portion of the identified trends and at least a portion of the established candidate interventions within the queryable GUI (e.g., within data presentation region 224 of GUIs 210 and/or 220) without input from the user. In other aspects, client device 102 may present all or a portion of the identified trends and established candidate interventions within an additional interface element (e.g., a pop-up window) that obscures a portion of GUI 210 and/or 220 (e.g., that obscures a portion of query specification region 222 while allowing the user to view data within data presentation region 224).

By detecting trends within intervention data 202 and objective data 204 and provided candidate interventions, the disclosed embodiments may highlight objectively-derived "bright spots" within the collected data, which may be exploited by the user to improve or enhance not only employee performance across the enterprise, but also a quality and impact of interventions (e.g., LMS training programs etc.) implemented across the enterprise. Further, and as described above, the disclosed embodiments may enable the user to objectively identify an impact of an intervention (e.g., a purposeful or non-purposeful action) on a performance of various individuals or group of individuals within the enterprise without the collective biases that often cloud conventional analytical techniques.

In some aspects, computer system 102 may determine whether additional intervention data (e.g., as received from data repositories 108 in step 302, above) and/or additional objective data (e.g., as received from device 110 in step 304 above) requires tagging and additional processing for presentation within portions of the queryable GUI (e.g., in step 328). If computer system 102 were to determine that neither additional intervention nor objective data requires tagging and processing (e.g., step 328; NO), then exemplary process 300 is complete in step 330. Alternatively, if computer system 102 were to determine that additional elements of intervention data and/or objective data require tagging and further processing (e.g., step 328; YES), exemplary process 300 may pass back to step 306, and computer system 102 may tag the additional elements of intervention and/or objective data, store the additional tagged data in data lake 106, and update portions of the queryable GUI using any of the exemplary processes described above.

In the embodiments described above, a computing system (e.g., computing system 102) may provide portions of intervention and objective data to a client device for presentation to a user. Based on the presented data, the user may objectively characterize an impact of one or more interventions on a behavior of one or more impacted groups within an enterprise. In other aspects, computing system 102 may provide the portions of intervention and objective data (e.g., which objectively characterizes the impacts of the interventions) to one or more additional computing systems (e.g., LMS platforms, ERM systems, etc.). For example, computing device 102 may transmit data identifying correlated trends in performance and employee temperature, along with data identifying one or more candidate interventions that mediate or exploit the identified correlated trends, to an ERM system associated with an enterprise. The ERM system may, in some aspects, be capable of automatically assessing, adopting, and/or implementing the candidate interventions within the enterprise without user input.

Further, in certain embodiments, computing system 102, may perform processes that objectively characterize an impact of one or more organizational interventions within an enterprise based on collected performance, biometric, and/or environmental data. As described above, these organizational interventions may include, but are not limited to, a training program or course, a configuration or layout of a workplace, an operational or environmental setting within the workplace, and/or an employee schedule or compensation structure, and the disclosed embodiments may objectively characterize an impact of one or more of these organizational interventions on a performance of, a physical condition of, and/or an environmental condition experienced by employees within the enterprise.

The disclosed embodiments are, however, not limited to these organizational interventions or to processes that objectively characterize an impact of these organizational interventions within the enterprise. In other aspects, the exemplary processes described above may objectively characterize an impact of one or more clinical interventions on various clinical subjects based on clinical-trial data, such as that collected during one or more clinical drug trials. The clinical interventions may include, but are not limited to, an assignment of a particular drug or therapy regimen to an individual subject or a group of subjects and an environmental condition experienced by the individual subject or group of subjects. Further, in certain aspects, the collected clinical-trial data may include, but is not limited to, clinical data indicative of an efficacy of the particular drug or therapy regimen and biometric data indicative of a physical condition of the individual subject or group of subjects.

Based on an analysis of the collected clinical-trial data, the disclosed embodiments may identify trends indicative of an increased efficacy of a clinical intervention among a group of subjects (e.g., a subset of a clinical population) exposed to common environmental conditions and sharing common physical characteristics. As described above, computing system 102 may identify these trends within the collected clinical-trial data using one or more machine-learning algorithms, and may present visual representations of these trends within an appropriate user interface without input from the user (e.g., a GUI presented by user device 104). In some aspects, the disclosed embodiments may reduce a likelihood that human error and other subjective biases influence the analysis of the collected clinical data and the determination of the efficacy of the clinical intervention.

Further, in additional instances, the disclosed embodiments may identify contraindicated populations at early stages of the clinical trials, which may facilitate a removal of impacted subjects from the clinical trials who are inappropriate candidates for the clinical intervention. By identifying the contraindicated populations based on objectively collected clinical data, and not based on subjective biases, the disclosed embodiments may enable a clinical research organization to save lives that would otherwise be adversely impacted by the identified counterindication or side effects.

A number of exemplary embodiments have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube), LCD (liquid crystal display) monitor, a touchscreen display, etc., for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Further, for situations in which the systems discussed here collect personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, zip code, or state level, so that a particular location of a user cannot be determined. Thus, the user may have control over how information is collected about him or her and used by a content server.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method comprising:
performing, by one or more analytics servers of an intervention impact characterization system that includes (i) a data lake, (ii) the one or more analytics servers that are in communication with the data lake, (iii) a learning management system (LMS) that generates first data that identifies a plurality of interventions, (iv) an enterprise risk management (ERM) system that includes one or more of an electronic thermostat, a radio-frequency identification (RFID) reader, an Internet-of-Things (IoT) device, or a Global Positioning System (GPS) sensor that generate second data that characterizes an impact of the interventions on at least one individual, and (v) a client device, operations that store the first and the second data within the data lake;
based on at least a portion of the first and second data, establishing, by the one or more analytics servers of the intervention impact characterization system, candidate query parameters for a queryable interface, the candidate query parameters identifying the interventions, the at least one individual, and portions of the second data;
providing, by the one or more analytics servers of the intervention impact characterization system, the candidate query parameters to the client device for presentation in a query specification region of the queryable interface;
receiving, by the one or more analytics servers of the intervention impact characterization system, and from the client device of the intervention impact characterization system, query data comprising at least a portion of the candidate query parameters, the portion of the candidate query parameters identifying at least one of the interventions and at least a portion of the second data;
querying, by the one or more analytics servers of the intervention impact characterization system, the data lake of the intervention impact characterization system, to obtain data consistent with the received portion of the candidate query parameters; and
providing, by the one or more analytics servers of the intervention impact characterization system, the obtained data to the client device of the intervention impact characterization system, the client device being configured to present (i) a visual representation of obtained data in a data presentation region of the user interface, and (ii) a representation of at least one of the interventions in a pop-up window within the queryable interface that obscures the query specification region only and that does not obscure the data presentation region, and the visual representation objectively characterizing an impact of the at least one intervention on the at least one individual.

2. The method of claim 1, wherein the data lake comprises a processing engine.

3. The method of claim 1, comprising:
obtaining at least a portion of the first data from one or more databases; and
obtaining at least a portion of the second data from the electronic thermostat, the RFID reader, the IoT device, or the GPS sensor.

4. The method of claim 1, wherein the IoT device comprises a biometric sensor or an environmental sensor.

5. The method of claim 1, comprising establishing a secure communications session with the data lake through an application programming interface (API).

6. The method of claim 1, wherein the plurality of interventions comprise at least one of a purposeful or non-purposeful action impacting the at least one individual.

7. The method of claim 1, wherein the plurality of interventions comprise at least one of (i) a training program in which the at least one individual participates, (ii) a change in a configuration of a workplace of the at least one individual, (iii) scheduled or unscheduled leave of the at least one individual, (iv) a change in a work schedule of the at least one individual, or (v) a change in a management structure of the workplace of the at least one individual.

8. The method of claim 1, wherein the second data comprises at least one of (i) data indicative of a performance of the at least one individual within a workplace, (ii) data indicative of one or more environmental conditions experienced by the at least one individual, and (iii) biometric data indicative of a physical condition of the at least one individual.

9. The method of claim 1, comprising:
modifying at least a portion of the first and second data to incorporate corresponding first and second tags, the modification maintaining a native format of the first and second data; and
storing the modified first and second data within the data lake.

10. The method of claim 9, comprising:
based on at least one of the first or second tags, identifying a portion a least one of the first or second data for presentation within the queryable interface; and
providing the at least one identified portion of the first or second data to the client device, the client device being configured to present a visual representation of at least one of identified portion of the first or second data within the queryable interface without input from the user.

11. The method of claim 1, comprising generating profile data for the at least one individual, the generated profile data comprising one or more identifiers representative of the at least one individual within the first and second data, and holistic data identifying a subset of the interventions that impact the at least one user.

12. The method of claim 1, comprising:
identifying a trend within the stored first and second data, the identified trend comprising a time variation of at least one of a performance of the at least one individual within a workplace, an environmental condition experienced by the at least one individual, or a physical condition of the at least one individual;
providing data indicative of the identified trend to the client device, the client device being configured to present a visual representation of the identified trend within a portion of the queryable interface without input from the user.

13. The method of claim 12, comprising:
establishing at least one candidate intervention that mediates or exploits the identified trend; and
providing data indicative of the identified trend and established candidate intervention to the client device, the client device being configured to present a visual representation of the identified trend and established candidate intervention within a portion of the queryable interface without input from the user.

14. The method of claim 13, comprising:
applying a machine-learning algorithm to at least a portion of the stored first and second data; and
based on an outcome of the applied machine-learning algorithm, establishing the at least one candidate intervention.

15. The method of claim 1, wherein:
the intervention impact characterization system further comprises (vi) an HVAC unit,
the second data comprises temperature data,
the at least one of the interventions comprises an intervention for operating the HVAC unit so as to change a temperature or air flow in an environment in which the at least one individual works, and
the method comprises operating the HVAC unit so as to change the temperature or air flow in the environment in which the at least one individual works.

16. The method of claim 15, wherein the HVAC unit is operated in response to a manual selection of a representation of the intervention for operating the HVAC unit in the pop-up window that obscures the query specification region.

17. The method of claim 15, wherein the HVAC unit is operated automatically in response to providing the representation of the at least one of the interventions in the pop-up window, without requiring a manual selection of the representation of the intervention for operating the HVAC unit in the pop-up window that obscures the query specification region.

18. An intervention impact characterization system including (i) a data lake, (ii) one or more analytics servers that are in communication with the data lake, (iii) a learning management system (LMS) that generates first data that identifies a plurality of interventions, (iv) an enterprise risk management (ERM) system that includes one or more of an electronic thermostat, a radio-frequency identification (RFID) reader, an Internet-of-Things (IoT) device, or a Global Positioning System (GPS) sensor that generate second data that characterizes an impact of the interventions on at least one individual, and (v) a client device, the intervention impact characterization system comprising:
a processor configured to execute computer program instructions; and
a computer storage medium encoded with the computer program instructions that, when executed by the processor, cause the system to perform operations comprising:
performing, by the one or more analytics servers of the intervention impact characterization system that includes, operations that store the first and the second data within the data lake;
based on at least a portion of the first and second data, establishing, by the one or more analytics servers of the intervention impact characterization system, candidate query parameters for a queryable interface, the candidate query parameters identifying the interventions, the at least one individual, and portions of the second data;
providing, by the one or more analytics servers of the intervention impact characterization system, the candidate query parameters to the client device for presentation in a query specification region of the queryable interface;
receiving, by the one or more analytics servers of the intervention impact characterization system, and from the client device of the intervention impact characterization system, query data comprising at least a portion of the candidate query parameters, the portion of the candidate query parameters identifying at least one of the interventions and at least a portion of the second data;
querying, by the one or more analytics servers of the intervention impact characterization system, the data lake of the intervention impact characterization system, to obtain data consistent with the received portion of the candidate query parameters; and
providing, by the one or more analytics servers of the intervention impact characterization system, the obtained data to the client device of the intervention impact characterization system, the client device being configured to present (i) a visual representation of obtained data in a data presentation region of the user interface, and (ii) a representation of at least one of the interventions in a pop-up window within the queryable interface that obscures the query specification region only and that does not obscure the data presentation region, and the visual representation objectively characterizing an impact of the at least one intervention on the at least one individual.

19. The system of claim 18, wherein the data lake comprises a processing engine.

20. A non-transitory computer-readable storage device encoded with a computer program, the computer program comprising instructions that, when executed by one or more computers, cause the one or more computers to perform operations comprising:
performing, by one or more analytics servers of an intervention impact characterization system that includes (i) a data lake, (ii) the one or more analytics servers that are in communication with the data lake, (iii) a learning management system (LMS) that generates first data that identifies a plurality of interventions, (iv) an enterprise risk management (ERM) system that includes one or more of an electronic thermostat, a radio-frequency identification (RFID) reader, an Internet-of-Things (IoT) device, or a Global Positioning System (GPS) sensor that generate second data that characterizes an impact of the interventions on at least one individual, and (v) a client device, operations that store the first and the second data within the data lake;

based on at least a portion of the first and second data, establishing, by the one or more analytics servers of the intervention impact characterization system, candidate query parameters for a queryable interface, the candidate query parameters identifying the interventions, the at least one individual, and portions of the second data;

providing, by the one or more analytics servers of the intervention impact characterization system, the candidate query parameters to the client device for presentation in a query specification region of the queryable interface;

receiving, by the one or more analytics servers of the intervention impact characterization system, and from the client device of the intervention impact characterization system, query data comprising at least a portion of the candidate query parameters, the portion of the candidate query parameters identifying at least one of the interventions and at least a portion of the second data;

querying, by the one or more analytics servers of the intervention impact characterization system, the data lake of the intervention impact characterization system, to obtain data consistent with the received portion of the candidate query parameters; and providing, by the one or more analytics servers of the intervention impact characterization system, the obtained data to the client device of the intervention impact characterization system, the client device being configured to present (i) a visual representation of obtained data in a data presentation region of the user interface, and (ii) a representation of at least one of the interventions in a pop-up window within the queryable interface that obscures the query specification region only and that does not obscure the data presentation region, and the visual representation objectively characterizing an impact of the at least one intervention on the at least one individual.

* * * * *